United States Patent

Kaneko

[11] Patent Number: 5,541,389
[45] Date of Patent: Jul. 30, 1996

[54] EXOTHERMIC DEVICE FOR PROVIDING SUBSTANTIALLY CONSTANT HEAT AGAINST DIFFERENT ELECTRIC SOURCES

[75] Inventor: Hitoshi Kaneko, Towada, Japan

[73] Assignee: Ohizumi MFG. Co., Ltd., Tokyo, Japan

[21] Appl. No.: 248,471

[22] Filed: May 24, 1994

[30] Foreign Application Priority Data

Jun. 8, 1993 [JP] Japan .................................. 5-137903

[51] Int. Cl.$^6$ ...................................................... H05B 1/02
[52] U.S. Cl. ........................... 219/505; 219/504; 219/481; 338/22 R
[58] Field of Search ................................. 219/504, 494, 219/505, 491, 481; 338/22 R

[56] References Cited

U.S. PATENT DOCUMENTS

| | | | |
|---|---|---|---|
| 4,505,803 | 3/1985 | Mase et al. | 204/425 |
| 4,544,829 | 10/1985 | Adachi et al. | 219/237 |
| 4,628,183 | 12/1986 | Satomura | 219/216 |
| 4,787,135 | 11/1988 | Nagahori | 29/612 |

Primary Examiner—Mark H. Paschall
Attorney, Agent, or Firm—Kanesaka & Takeuchi

[57] ABSTRACT

Positive temperature coefficient thermistor is prepared from a sintered body of a ceramic material composition which has as a substrate $BaTiO_3$ with metallic oxide. There is almost no difference of exothermic temperature even if different voltage is applied to the positive temperature coefficient thermistors. Thus, when the present invention is used in countries or areas in which both 110 V and 220 V of commercial voltages are used, almost certain temperature can be obtained without changing voltage by a transformer.

7 Claims, 5 Drawing Sheets

EXOTHERMIC DEVICE FOR PROVIDING SUBSTANTIALLY CONSTANT HEAT AGAINST DIFFERENT ELECTRIC SOURCES

BACKGROUND OF THE INVENTION

1. Field of the Invention

The present invention relates to an exothermic device for different electric source for providing constant heat regardless the voltage applied to the exothermal device which is used, e.g., a heat source for evaporating an insecticidal liquid or paste for an electric mosquito-fuge device.

2. Description of the Related Art

In a liquid-type electric mosquito-fuge apparatus as shown in FIG. 5, a ceramic core 3 is inserted in a tank 2 filled with an insecticidal liquid 1, and an exothermic device 4 is fitted on the periphery of the core 3 projected above the tank 2. Electricity is supplied to the exothermic device 4 for heating and the heat is transmitted to the core 3 to evaporate the insecticidal liquid 1 sucked up in the core 3, whereby diffusing the vapour of the insecticidal liquid in a room.

The exothermic device 4 includes a positive temperature coefficient thermistor element 5 as the exotherm element. The positive temperature coefficient thermistor element has a sintered body of a ceramic composition in which the substrate is $BaTiO_3$ and metal oxides are doped in the substrate. As examples of the positive temperature coefficient thermistor element, there are a thermistor element in which electrodes are formed on both faces of a cylindrical body (Japanese Utility Model Publication No. Hei 1-12395) and a thermistor element in which electrodes are formed on both faces of an arc shaped segment. The exothermic device 4 of the liquid-type electric mosquito-fuge apparatus is normally used by a commercial electric source of 100 V in Japan.

However, the positive temperature coefficient thermistor element incorporated in the exothermic device has such a problem that exothermic temperature varies in proportion to an applied voltage. When 220 V is applied to the exothermic device of a general liquid-type electric mosquito-fuge apparatus, an exothermic temperature rises more than about 7° C. in comparision with the exothermic device to which 100 V is applied.

When the exothermic temperature rises more than 7° C. above a preset temperature, the amount of insecticidal liquid is abnormally evaporated and diffused faster, so that it can not be used for a predetermined effective term of the insecticidal liquid filled in a tank.

In Japan, the voltage of the commercial electric source is unified at AC 100 V. Some countries use AC 220 V as the commercial electric source. Moreover, there are some other countries which use two kinds of voltages for the commercial electric source.

As one example, the commercial electric sources used in the world are shown in the following Table 1. From Table 1, it may be understood that there are many countries which use two kinds of voltages selectively.

TABLE 1

| Area | Country (State) | Voltage (V) | Frequency (Hz) |
|---|---|---|---|
| Asia | Japan | 100 | 50/60 |
| | China | 110/220 | 50 |
| | Hong Kong | 200/220 | 50 |

TABLE 1-continued

| Area | Country (State) | Voltage (V) | Frequency (Hz) |
|---|---|---|---|
| | India | 220 | 50 |
| | Indonesia | 127/220 | 50 |
| | Korea | 110/220 | 60 |
| | Philippines | 110/220 | 60 |
| | Singapore | 110/230 | 50 |
| | Taiwan | 110 | 60 |
| | Thailand | 240 | 50 |
| North America | U.S.A. | 120 | 60 |
| | Hawaii | 110/120 | 60 |
| | Canada | 120/240 | 60 |
| Central & South America | Argentine | 220 | 50 |
| | Brazile | 127/220 | 60 |
| | Chile | 220 | 50 |
| | Mexico | 125 | 60 |
| | Peru | 220 | 60 |
| Europe | Austria | 220 | 50 |
| | Belgium | 110/200 | 50 |
| | Denmark | 110/220 | 50 |
| | France | 127/220 | 50 |
| | Germany | 127/220 | 50 |
| | Greece | 220 | 50 |
| | Italy | 110/220 | 50 |
| | Spain | 110/220 | 50 |
| | Sweden | 110/220 | 50 |
| | Great Britain | 240 | 50 |
| | former USSR | 220 | 50 |
| Africa | Kenia | 240 | 50 |
| Oseania | Australia | 240 | 50 |
| | New Zealand | 230 | 50 |

According to Table 1, Korea, the Philippines, Singapore, Belgium, Denmark, Italy, Spain and Sweden use two kinds of voltages, i.e., 110 V and 220 V for the commercial electric source. Therefore, when a positive temperature coefficient thermistor is incorporated in an exothermic device of a mosquitofuge apparatus which is used in these countries, it is necessary to provide a transformer which drops the voltage from 220 V to 110 V of the commercial electric source or to use a transformer to be switched according to the necessity by providing a voltage-switching means to the transformer. To provide the transformer to the apparatus causes the cost-up in manufacturing and increases the weight and volume of the apparatus. Although it has been known that there is an exotherm device which can be used for both AC 110 V and AC 220 V, the purpose of this kind of exothermic the device is merely to improve confidentiality and increase maximum rated voltage. In these exothermic devices, the difference of exothermic temperatures caused by the difference of applied voltages is not considered.

Accordingly, the present invention is to provide an exothermic device which does not cause great degree of exothermic temperature in accodance with the change of an applied voltage.

Another object of the present invention is to provide a positive temperature coefficient thermistor which possesses a region of a current-voltage characteristic as an exothermic device in which a current drops linearly at an angle of about 45° C. in accordance with the increase of an applied voltage.

Another object of the present invention is to provide a positive temperature coefficient thermistor which includes a range of from 100 V to 240 V of applied voltages wherein the voltage-current characteristic is damped linearly at an angle of 45°, i.e., which substantially covers the voltage-range of the commercial electric source employed in the countries of the world.

Still another object of the invention is to provide a positive exothermic temperature coefficient thermistor which is formed by a ceramic material composition having BaTiO$_3$ as a substrate in which the voltage-current characteristic is damped linearly at an angle of 45°.

SUMMARY OF THE INVENTION

In accordance with the invention, an exothermic device for providing constant heat by electricity is formed. The exothermic device is formed of a sintered body made of a ceramic material of BaTiO$_3$ containing a metal oxide. The sintered body forms a positive temperature coefficient thermistor and includes in a predetermined voltage range a voltage-current characteristic defined in an equation:

$$Vx+Iy=a$$

wherein $a$ is a constant value, Vx is a voltage on an axis of abscissa and Iy is a current on an axis of ordinate in a cartesian coordinate. The voltage range extends from a predetermined value to a value at least twice as much as the predetermined value. When a voltage in the voltage range is applied to the sintered body, the sintered body provides heat at a substantially constant value.

The predetermined value for satisfying the equation is at least between 100 volt and 240 volt. Preferably, the ceramic material of BaTiO$_3$ further contains SiO$_2$ and Mn or Mn ion. In this case, 0.1 wt % of SiO$_2$ and 0.020 wt % of Mn or Mn ion are included.

The ceramic composition may have a formula of (BaPbCaY)TiO$_3$+SiO$_2$+Mn or (BaPbSrY)TiO$_3$+SiO$_2$+Mn.

In this case, 0.1 wt % of SiO$_2$ and 0.020 wt % of Mn or Mn ion are included in the ceramic material.

DETAILED DESCRIPTION OF PREFERRED EMBODIMENTS

BatiO$_3$ ceramic composition has been studied.

Figure 1:
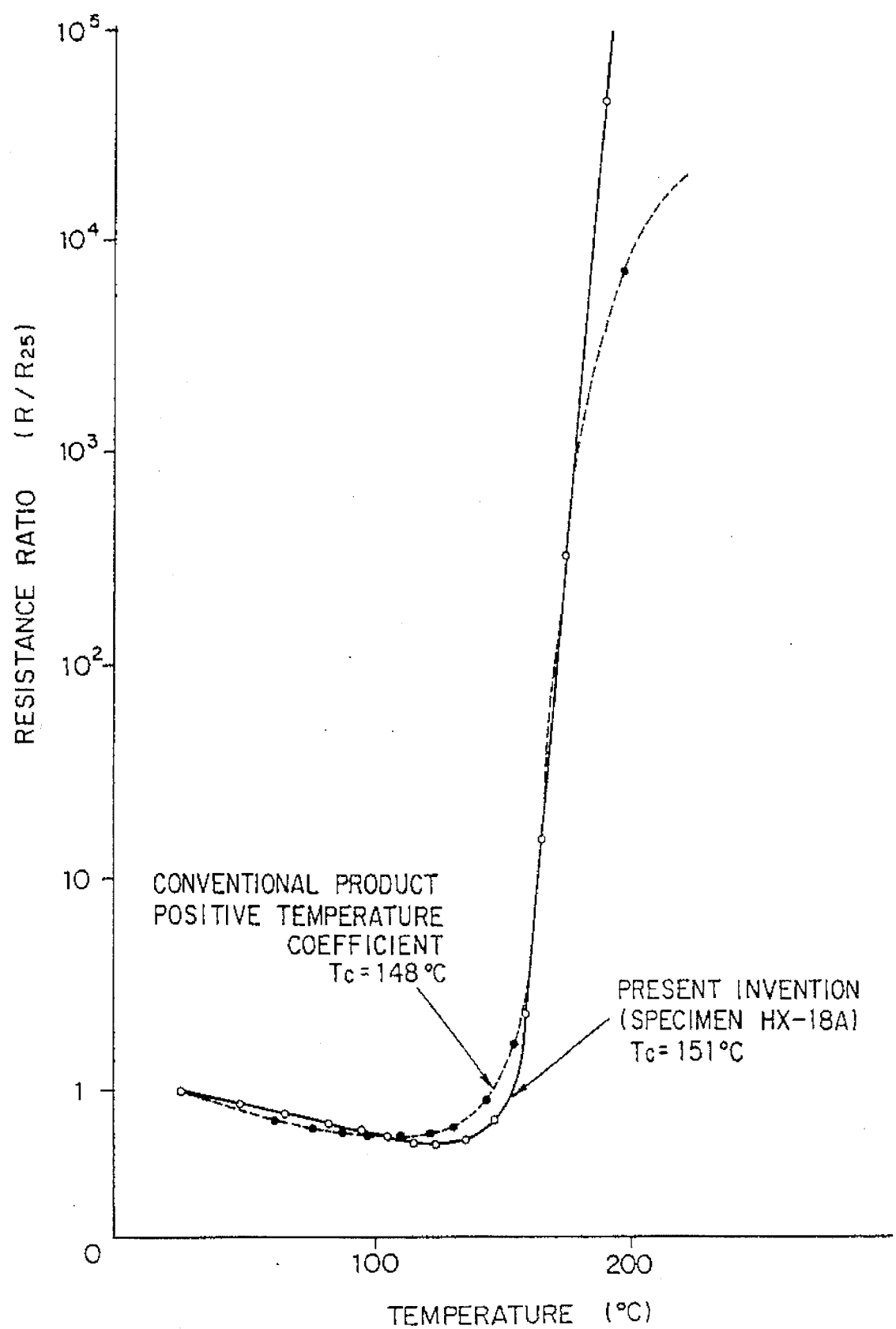
FIG. 1 is a graph showing a temperature-resistance characteristic of a positive temperature coefficient thermistor.
Figure 2:
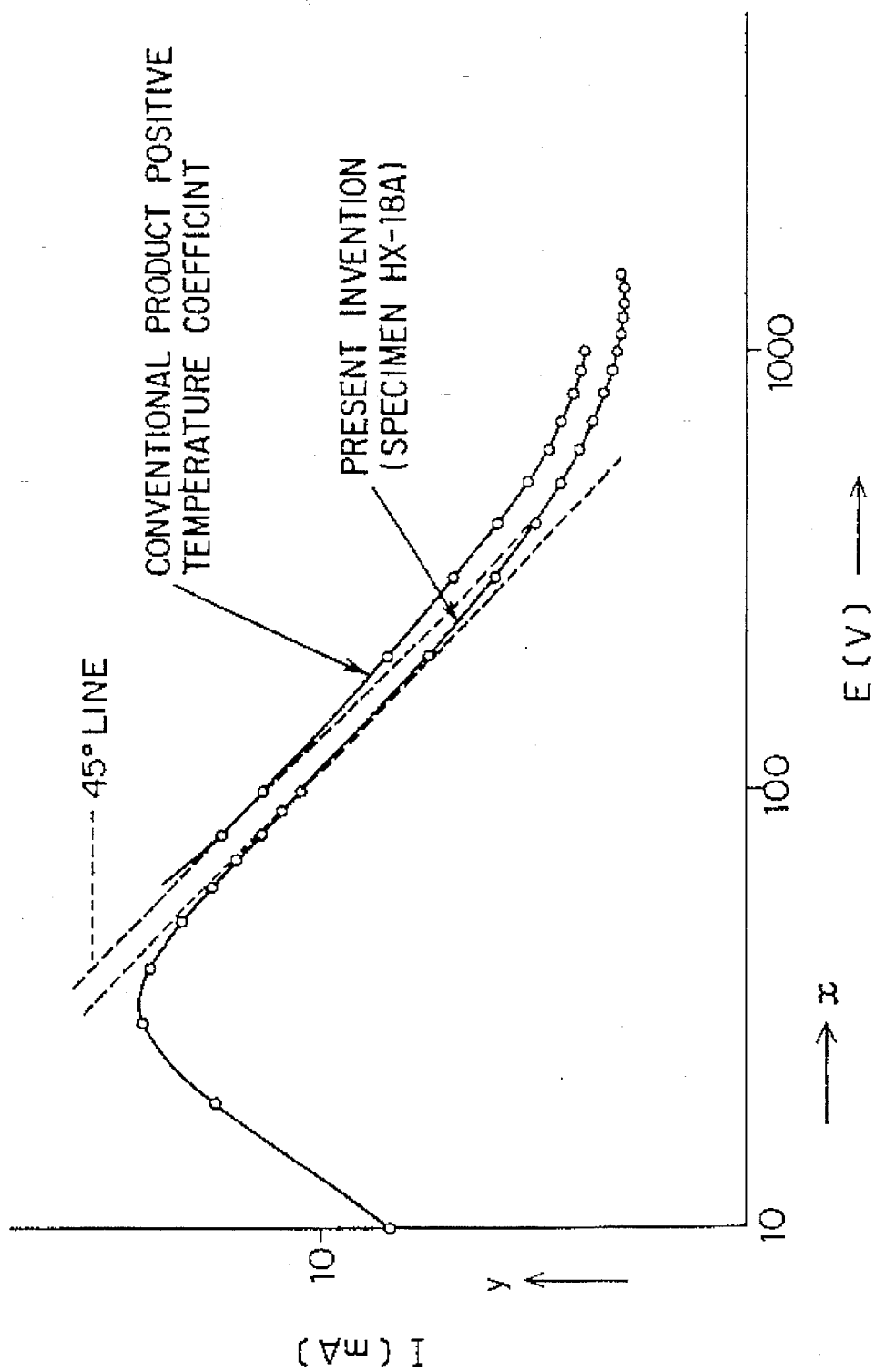
FIG. 2 is a graph showing a voltage-current characteristic of a positive temperature coefficient thermistor.

In case an amount of specific additives which are to be added to a ceramic-material composition containing BaTiO$_3$ as a substrate is fixed, e.g., when the additive amounts of SiO$_2$ and Mn or Mn ion are SiO$_2$=0.1% by weight and Mn=0.020% by weight in a positive temperature coefficient thermistor which has (BaPbCaY)TiO$_3$+SiO$_2$+Mn, it is seen a sudden standing-up of temperature-resistance characteristic after the Curie point (Tc) as shown in FIG. 1. Namely, according to FIG. 2, when the thermistor element generates heat after the Tc, the current value is suddenly decreased in inverted proportion to the voltage value even though the applied voltage is increased and thus, it can be considered that the increase of electric power is suppressed. When the voltage-current characteristic thereof is seen, it has been found that a damping characteristic is very close to a linear line of 45° at the region of at least 100 V to 240 V of applied voltage, as shown in FIG. 2. Namely, it has been found that damping characteristic which satisfies the relationship of $$Vx+Iy=a (a \text{ is constant})$$

in Cartesian coordinates having both logarithmic scales of an abscissa axis Vx and ordinate axis Iy. In other words, since consumption of electric power is constant in the specific range of the voltage, the thermistor element is heated at a constant temperature.

In FIG. 1, characteristics of the conventional thermistor element containing a ceramic material composition having BaTiO$_3$ used as a substrate are shown as a comparative example.

In view of FIG. 2, when a ceramic composition in which the additive amount of SiO$_2$ of (BaPbCaY)TiO$_3$+SiO$_2$+Mn or Mn ion is 0.1% by weight and that of Mn or Mn ion is 0.020% by weight is sintered to produce a positive thermistor element and this element is used as an exothermic device, change in consumed electric power P=VI is small at the applied voltage between 100 V and 240 V. Thus, there causes almost no difference of the exothermic temperature at least within the range of from 100 V to 240 V of applied voltage.

In general, in a normal positive temperature coefficient thermistor, as shown in the comparative example in FIG. 2, the damping characteristic is generally lower than the linear line of 45°, and as a result, the greater the applied voltage is, the more the consumed electric power increases and the higher the exothermic temperature becomes.

This specific characteristics according to the present invention have been obtained from the results of the experiments. According to the abovedescribed composite, the range in which 45° linear line characteristic is shown is about from 70° C. to 250° C. Conventionally, this range includes the range of 100 V to 240 V of the commercial electric source-voltage. The other feature of the above-described composition is to obtain high dielectric strength. Moreover, the exothermic temperature can be arbitrarily controlled by increasing or decreasing the amount of Pb in the composition.

Figure 3:
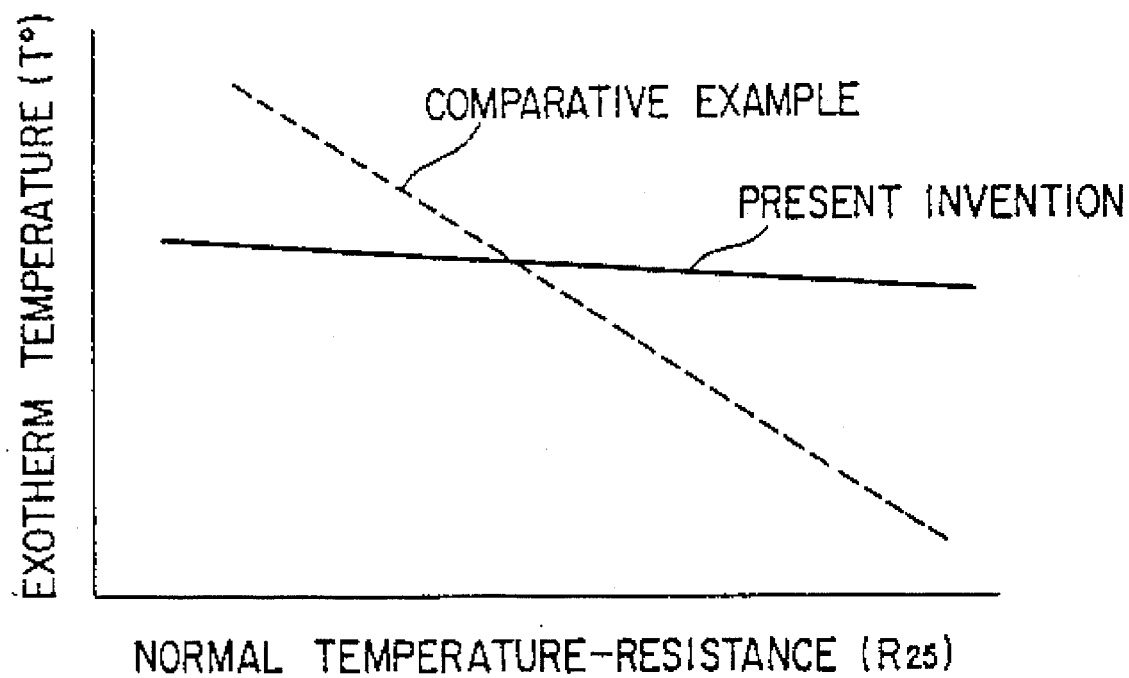
FIG. 3 is a graph showing a normal resistance-exothermic temperature characteristic.

On the other hand, in a composition of (Ba, Pb, Ca, Y)TiO$_3$+SiO$_2$ (0.1% by weight)+Mn (0.020% by weight), it is recognized that similar damping characteristic is obtained in voltage-current characteristic even though a composition in which Ca is replaced with Sr is used. As shown in the comparative example of FIG. 3, an exothermic temperature generally changes in inverted proportion to a normal temperature-resistance R$_{25}$. However, in the present invention as shown in FIG. 3, even in a case of the composition in which Ca is replaced with Sr, there is almost no change of exothermic temperature within the range of the normal temperature-resistance R$_{25}$ which can be normally used. This means that when more than two sets of the positive temperature coefficient thermistors according to the composition of the present invention are used as an exothermic device, even though the normal temperature-resistances R$_{25}$ of the respective thermistors are not the same, the same exothermic amount can be obtained.

Accordingly, the positive temperature coefficient thermistor according to the present invention can be made with a shape of cylinder or segment and electrodes can be fitted to both faces of the thermistor.

The examples of the present invention are explained below.

EXAMPLE 1

Table 2 shows the result of normal temperature-resistance (KΩ) exotherm temperatures (°C.) of applied voltages 220

V and 100 V, dielectric strength(V) and Curie point (°C.) measured with respect to positive temperature coefficient thermistors sintered by fixing x=7.0 mol. % and changing y, z and α, β in a ceramic composite of $(Ba_{1-x-y-z}Pb_xCa_yY_z)Ti_{1.000}O_3$+α wt % $SiO_2$+β wt % Mn.

HX-18A, i.e., thermistor sintered by presetting substantially α=0.1% by weight, β=0.020% by weight, x=7.0% by weight, y=4.0% by weight and z=0.40% by weight, is excellent in voltage-current damping characteristic. Thus, these compositions can be used in the invention.

TABLE 2

$[(Ba_{1-x-y-z}Pb_xCa_yY_z)Ti_{1.000}O_3 + α$ wt % $SiO_2 + β$ wt % Mn

|  | Pb (mol %) x | Ca (mol %) y | Y (mol %) z | $SiO_2$ (wt %) α | Mn (wt %) β | Sintering pattern | Normal temperature resistance | Exotherm temperature (°C.) 100 V | Exotherm temperature (°C.) 220 V | Difference of temperature | Dielectric strength (V) | Curier point (°C.) |
|---|---|---|---|---|---|---|---|---|---|---|---|---|
| HX-14 | 7.0 | 2.0 | 0.37 | 0.1 | 0.020 | 1330° C. × 1 hr | 1.61–2.24 | 161.8–161.9 | 166.6–167.3 | 4.8–5.4 | 780 V |  |
| HX-15 | " | " | 0.40 | " | " | " | 1.45–2.26 | 160.5–161.8 | 163.8–165.7 | 3.3–3.9 |  |  |
| HX-16 | " | " | 0.43 | " | " | " | 0.63–1.00 | 161.4–161.7 | 165.3–168.3 | 4.6–4.9 |  |  |
| HX-17 | " | 4.0 | 0.37 | " | " | " | 2.03–2.35 | 159.5–159.9 | 162.0–162.6 | 2.5–2.7 |  |  |
| HX-18A | " | " | 0.40 | " | " | " | 1.94–2.77 | 160.2–160.7 | 162.0–162.7 | 1.8–2.1 | 1300 V | 151 |
| HX-18B | " | " | " | " | " | " | 1.37–1.78 | 160.2–161.4 | 162.6–163.3 | 1.9–2.6 |  |  |
| HX-19 | " | " | 0.43 | " | " | " | 0.76–1.18 | 159.7–160.0 | 163.0–163.9 | 3.0–4.0 |  |  |
| HX-40 | " | 5.0 | 0.40 | " | " | " | 2.77–4.05 | 157.0–158.7 | 160.4–160.9 | 1.9–3.4 |  |  |
| HX-41 | " | 6.0 | " | " | " | " | 1.21–1.48 | 157.3–159.8 | 159.7–162.3 | 2.4–2.8 |  |  |
| HX-42 | " | 4.0 | 0.42 | 0.2 | " | " | 0.44–0.70 | 181.5–163.8 | 166.6–169.6 | 5.1–5.8 |  |  |
| HX-43 | " | " | " | " | 0.021 | " | 0.86–1.03 | 159.6–162.2 | 163.6–166.0 | 3.8–4.3 |  |  |
| HX-44 | " | 6.0 | 0.40 | 0.2 | 0.020 | " | 0.52–0.92 | 160.0–162.2 | 164.0–167.0 | 4.0–5.3 |  |  |
| HX-45 | " | " | " | " | 0.021 | " | 0.89–1.17 | 160.0–161.2 | 164.2–165.8 | 4.1–4.6 |  |  |

Specimens HX-12, HX-13, HX-24, HX-25, HX-26, HX-28 to HX-32 were not used for the experiment since they were destroyed in their forms of their electrodes were separated at the time when they were molded into a pattern of an arc-shaped segment or at the sintering time. Specimens HX-18A and HX-18B are experimental data in cases that normal temperature resistance were differentiated.

From the result of Table 2, when it was preset that the additive amount of $SiO_2$ is α=0.1% by weight and the additive amount of Mn or Mn ion is β=0.020% by weight, the temperature difference of exothermic temperature between at the applied voltage of 220 V and 100 V is greatly reduced to less than 7° C. When either one of the amount of α and β is increased even slightly, the temperature difference of the exothermic temperatures is also lower than 7° C., but there is a tendecy of increase in the temperature difference. Although the measured values are not constant, when the values of dielecric strength and normal temperature resistance are judged in total, it can be said that specimen Table 3 shows measured results in case that the additive amount of $SiO_2$ is fixed to 0.4% by weight and the additive amounts of other ingredients are varied. As apparent from Table 3, the temperature difference between exothermic temperatures at 220 V and 100 V of applied voltage, is remarkably increased in comparison with Table 2. Thus, these compositions can not be used in the invention.

TABLE 3

$(Ba_{1-x-y-z}Pb_xCa_yY_z)Ti_{1.002}O_3 + 0.4$ wt % $SiO_2 + β$ wt % Mn

|  | Pb (mol %) x | Mn (wt %) β | Ca (mol %) y | Y (mol %) z | Sintering pattern | Narmal temperature resistance | Exotherm temperature (°C.) 100 V | Exotherm temperature (°C.) 220 V | Difference of temperature | Dielectric strength (V) | Curier point (°C.) |
|---|---|---|---|---|---|---|---|---|---|---|---|
| HX- 10A | 10.5 | 0.022 | 16.0 | 0.40 | 1320° C. × 1 hr | 2.44–2.95 | 154.9–155.7 | 164.4–165.5 | 9.8–10.7 |  | 155 |
| - 10B | " | " | " | 0.37 | " | 1.53–2.04 | 157.7–158.7 | 167.0–167.7 | 8.9–9.3 |  |  |
| - 10C | " | " | " | 0.34 | 1330° C. × 2 hr | 2.46–3.65 | 158.5–160.8 | 166.8–169.1 | 8.3–8.9 |  |  |
| - 10D | " | " | " | 0.31 | " | 1.06–1.22 | 165.7–166.1 | 174.1–174.5 | 8.4–8.6 |  |  |
| HX- 1 | 12.0 | 0.022 | 13.5 | 0.54 | 1330° C. × 1 hr | 14.6–19.9 | 150.5–152.8 | 167.7–169.2 | 15.3–17.2 |  |  |
| - 2 | " | " | " | 0.50 | " | 1.75–2.00 | 166.9–168.5 | 172.9–174.5 | 5.7–6.4 |  | 138 |
| - 3 | " | " | " | 0.46 | 1320° C. × 1 hr | 3.48–4.87 | 160.1–162.1 | 172.0–173.0 | 10.9–12.2 |  |  |
| - 3A | 10.5 | " | " | 0.43 | 1330° C. × 2 hr | 2.11–3.60 | 160.1–162.1 | 168.5–170.3 | 8.2–8.4 |  |  |
| - 3B | " | " | " | 0.40 | " | 0.83–1.50 | 166.4–167.6 | 173.5–175.5 | 7.1–7.9 |  |  |
| - 3C | " | " | " | 0.37 | " | 0.63–1.22 | 168.3–169.2 | 175.7–176.8 | 7.4–7.6 |  |  |
| - 3D | " | " | " | 0.34 | " | 0.98–1.47 | 167.4–168.9 | 175.3–175.8 | 7.6–8.2 |  |  |
| HX- 4 | 11.0 | 0.022 | 10.0 | 0.46 | 1310° C. × 1 hr | 1.29–1.94 | 167.3–168.9 | 176.4–177.3 | 8.4–9.1 |  |  |
| - 5 | " | " | " | 0.47 | " | 1.22–1.86 | 168.9–170.5 | 176.4–177.0 | 6.3–7.5 |  |  |
| HX- 6 | 11.0 | 0.022 | 6.0 | 0.46 | 1320° C. × 1 hr | 0.41–0.47 | 179.4–179.6 | 187.2–187.9 | 7.8–8.5 |  |  |
| - 7 | " | " | " | 0.48 | " | 0.68–0.78 | 176.9–177.6 | 184.0–184.8 | 7.1–7.2 |  |  |
| HX- 8 | 11.0 | 0.022 | 2.0 | 0.46 | 1310° C. × 1 hr | 1.43–1.76 | 179.8–180.4 | 188.4–187.5 | 7.7–8.4 |  |  |
| - 9 | " | " | " | 0.50 | 1320° C. × 1 hr | 0.81–1.47 | 177.0–177.6 | 182.3–183.3 | 5.8–5.9 |  |  |
| - 9A | 7.0 | " | " | 0.53 | 1330° C. × 2 hr | 1.13–2.02 | 162.0–163.0 | 167.8–168.7 | 5.5–5.9 |  |  |
| - 9B | " | " | " | 0.56 | 1330° C. × 2 hr | 1.14–1.50 | 159.8–161.8 | 165.6–167.2 | 5.0–6.1 |  |  |

TABLE 3-continued

| | | | | | $(Ba_{1-x-y-z}Pb_xCa_yY_z)Ti_{1.002}O_3$ + 0.4 wt % $SiO_2$ + β wt % Mn | | | | | |
|---|---|---|---|---|---|---|---|---|---|---|
| | Pb | Mn | Ca | Y | | Normal | Exotherm temperature (°C.) | | | |
| | (mol %) x | (wt %) β | (mol %) y | (mol %) z | Sintering pattern | temperature resistance | 100 V | 220 V | Difference of temperature | Dielectric strength (V) | Curier point (°C.) |
| - 9C | " | " | " | 0.59 | " | 1.52–1.89 | 160.3–162.7 | 165.6–168.0 | 5.2–5.7 | 700- | |
| - 9D | " | " | " | 0.62 | 1330° C. × 1.5 hr | 1.64–2.42 | 158.8–160.8 | 163.9–166.0 | 4.6–6.0 | 700- | |
| - 9E | 8.5 | " | " | 0.62 | 1320° C. × 1.5 hr | 0.79–2.10 | 160.3–164.0 | 169.2–173.3 | 7.1–8.6 | | |
| - 9i | 7.0 | 0.024 | " | 0.61 | 1330° C. × 2 hr | 1.24–1.74 | 159.9–161.1 | 165.9–167.2 | 5.9–6.2 | | |
| - 9j | " | 0.026 | " | 0.61 | " | 2.56–3.03 | 161.0–161.9 | 168.8–167.9 | 5.6–6.0 | | |
| HX- 11A | 7.0 | 0.024 | 0 | 0.62 | 1330° C. × 2 hr | 0.25–0.31 | 169.5–171.8 | 181.4–184.5 | 11.0–12.7 | | |
| - 11B | " | " | " | 0.64 | " | 0.56–0.83 | 163.7–166.0 | 175.1–180.3 | 10.8–14.3 | | |

EXAMPLE 2

Table 4 shows the result of normal temperature-resistance (KΩ), exothermic temperatures (°C.) of applied voltages 220 V and 100 V, dielectricstrength (V) and Curie point (°C.) measured with respect to positive temperature coefficient thermistors sintered by fixing the additive amount α of $SiO_2$ to α=0.1% by weight and the additive amount of β of Mn to β=0.02 and changing mol % of x, y and z in a ceramic composite of $(Ba_{1-x-y-z}Pb_xSr_yY_z)Ti_{1.000}O_3$+α wt % $SiO_2$+β wt % Mn.

though it is inferior in comparison with the Example 1. Thus, these compositions can be used in the invention.

Table 5 is an example in which α and β as well as x, y and z are variously changed.

TABLE 4

| | | | | | | $II(Ba_{1-x-y-z}Pb_xSr_yY_z)Ti_{1.000}O_3$ + α wt % $SiO_2$ + β wt % Mn | | | | | |
|---|---|---|---|---|---|---|---|---|---|---|---|
| | Pb | Sr | Y | | | | Normal | Exotherm temperature (°C.) | | Di- | |
| | (mol %) x | (mol %) y | (mol %) z | $SiO_2$ (wt %) α | Mn (wt %) β | Sintering pattern | temperature resistance | 100 V | 220 V | Difference of temperature | electric strength (V) | Curier point (°C.) |
| HX-20 | 10.0 | 3.0 | 0.4 | 0.1 | 0.020 | 1350° C. × 2 hr | 1.30–3.14 | 164.4–165.8 | 166.6–169.8 | 2.2–4.3 | 1000 | |
| HX-21A | " | 4.0 | " | " | " | " | 1.71–3.36 | 160.0–162.0 | 162.4–165.6 | 2.3–3.6 | " | |
| HX-21B | " | " | " | " | " | 1340° C. × 2 hr | 2.15–4.31 | 159.0–161.4 | 162.2–164.3 | 2.9–3.8 | 1000 | |
| HX-22 | " | 5.0 | " | " | " | " | 1.14–1.80 | 158.7–159.6 | 161.8–163.0 | 3.0–3.7 | " | |
| HX-23 | " | 4.0 | 0.43 | " | " | " | 0.86–1.20 | 159.4–161.4 | 163.0–164.9 | 2.9–3.9 | " | |
| HX-39A | 9.88 | " | 0.40 | " | " | 1340° C. × 2 hr | 0.83–1.23 | 159.4–161.4 | 163.0–164.9 | 2.4–3.8 | 1100 | |
| HX-39B | " | " | " | " | " | " | 1.20–1.94 | 158.3–160.4 | 160.1–163.5 | 2.4–3.8 | 1200 | |
| HX-39C | " | " | " | " | " | " | 1.31–2.01 | 159.2–161.2 | 161.9–163.7 | 2.4–3.4 | 1400 | 146 |

Specimens HX-21A and HX-21B, and specimens HX-39A, HX-39B and HX-39C are experimental data in which normal temperature resistances were differentiated.

From the result of Table 4, it is recognized that the temperature difference of the exothermic temperatures of 220 V and 100 V of the applied voltage is relatively stable,

TABLE 5

| | | | | | | $IV(Ba_{1-x-y-z}Pb_xSr_yY_z)Ti_{1.002}O_3$ + α wt % $SiO_2$ + β wt % Mn | | | | | |
|---|---|---|---|---|---|---|---|---|---|---|---|
| | Pb | Sr | Y | | | | Normal | Exotherm temperature (°C.) | | Di- | |
| | (mol %) x | (mol %) y | (mol %) z | $SiO_2$ (wt %) α | Mn (wt %) β | Sintering pattern | temperature resistance | 100 V | 220 V | Difference of temperature | electric strength (V) | Curier point (°C.) |
| HX-27 | 9.0 | 3.0 | 0.4 | 0.1 | 0.023 | 1320° C. × 1 hr | 3.99–7.23 | 161.7–162.8 | 170.8–172.4 | 9.1–9.6 | | |
| HX-33 | 10.0 | " | " | 0.1 | 0.021 | 1350° C. × 1 hr | 0.70–1.06 | 161.9–164.2 | 168.1–172.0 | 6.2–7.8 | | |
| HX-34 | " | " | " | 0.2 | " | " | 0.73–0.97 | 163.0–163.8 | 169.4–170.3 | 6.4–6.5 | | |
| HX-35 | " | " | 0.43 | 0.1 | 0.022 | " | 0.74–0.98 | 160.9–161.5 | 165.0–166.2 | 4.1–4.7 | | |
| HX-36 | 9.5 | " | 0.4 | " | 0.021 | " | 0.71–1.08 | 160.7–161.5 | 165.2–166.9 | 4.5–5.4 | | |
| HX-37 | " | " | " | 0.2 | " | " | 0.47–0.68 | 162.0–163.0 | 167.4–169.3 | 5.4–6.3 | | |
| HX-38 | " | " | 0.43 | 0.1 | 0.022 | 1350° C. × 1 hr | 3.34–5.13 | 156.6–155.1 | 161.4–162.4 | 6.3–6.8 | | |

As apparent from the result of Table 5, it is recognized that as the deviation from α=0.1 and β=0.020 increases, the temperature differences of exothermic temperatures of positive temperature coefficient thermistors between 220 V and 100 V of the applied voltage, become great. Thus, these compositions can not be used in the invention.

EXAMPLE 3

In this Example, normal temperature-resistance $R_{25}$ KΩ of compositions obtained by variously changing sintering temperatures and exothermic temperatures in which the applied voltages are preset at 100 V and 220 V were measured about ceramic material composite ((BaPbSrY)$TiO_3$+$SiO_2$ (0.1% by weight)+Mn (0.020% by weight). The measured results are shown in Table 6.

TABLE 6

| Sintering temperature | Normal temperature resistance | 100 V Exotherm | 220 V Exotherm | Difference of temperature |
|---|---|---|---|---|
| 1320° C. × 2 hr | 1.65~1.75 | 159.1~162.9 | 161.5~163.8 | 0.8~3.0 |
| 1340° C. × 2 hr | 0.99~1.30 | 159.0~160.0 | 162.6~163.5 | 2.8~3.6 |
| 1350° C. × 2 hr | 0.96~1.10 | 160.0~160.4 | 163.3~163.8 | 3.3~3.5 |
| 1360° C. × 2 hr | 1.05~1.15 | 159.3~160.1 | 162.7~163.5 | 3.2~3.4 |
| 1370° C. × 2 hr | 1.23~1.39 | 159.5~160.2 | 162.1~163.1 | 2.8~3.1 |
| 1380° C. × 2 hr | 1.62~1.92 | 158.8~159.8 | 161.8~162.6 | 2.7~3.2 |

"1320° C. × 2 hr" element was insufficient sintering and exotherm temperatures change greatly depending on examples.

As apparent from the result in Table 6, positive temperature coefficient thermistor elements sintered at 1320° C. of the sintering temperature for two hours greatly changed exothermic temperatures depending on the elements due to insufficient sintering, but the width of change or deviation in normal temperature resistance $R_{25}$ was smaller than normal width within the range of sintering temperatures of 1340° C. to 1380° C. It was clarified that the deviation of the temperature differences of the positive exothermic temperatures at the applied voltages of 220 V and 100 V is small and exothermic temperature was almost not affected by the sintering temperature.

Normally, the positive temperature coefficient thermistors change exothermic temperature in inverse proportion to normal temperature resistance $R_{25}$. The positive temperature coefficient thermistor which uses the abovementioned composition does not substantially change exothermic temperature within the range of the normal temperature resistance $R_{25}$ which is normally used. Therefore, there is no great variation for the exothermic temperature characteristic of the element even though the sintering temperature becomes slightly up and down and the normal temperature resistance $R_{25}$ is varied, at the mass production. The exothermic devices used in Table 6 are included in the present invention.

EXAMPLE 4

Figure 4:
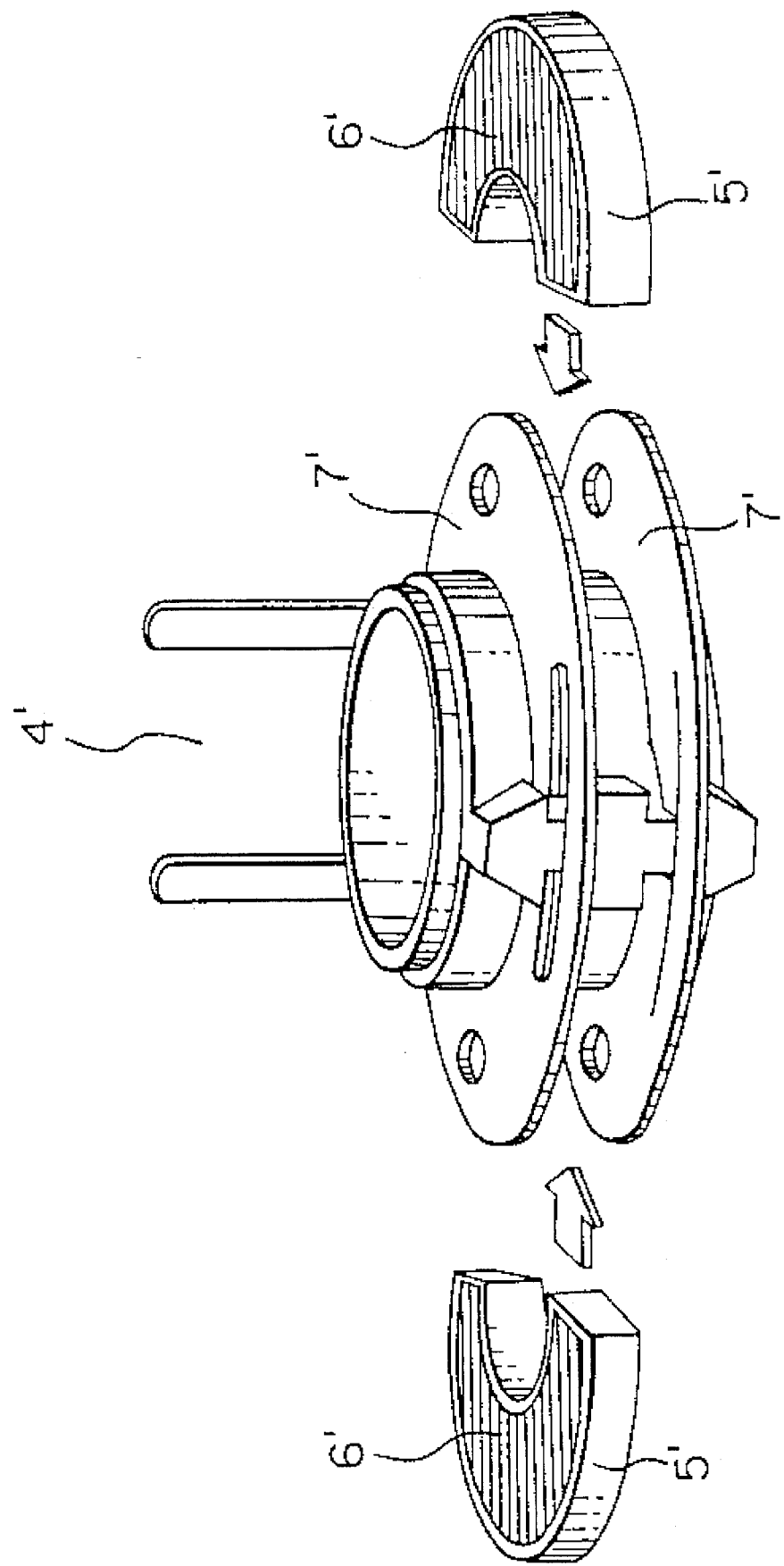
FIG. 4 is an exploded perspective view showing a manner to assemble a positive temperature coefficient thermistor.
Figure 5:
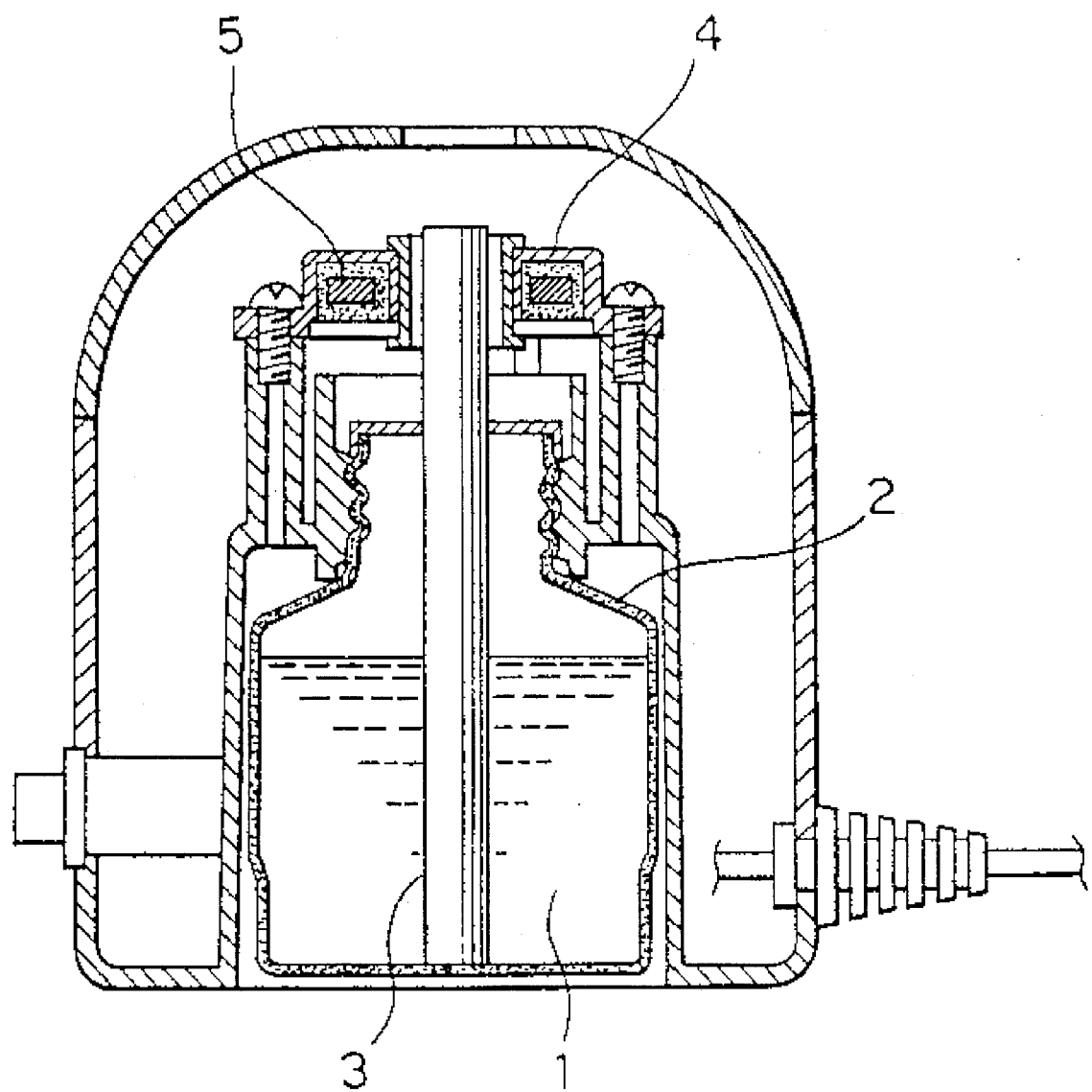
FIG. 5 is a cross sectional view of a conventional elecric mosquito-fuge apparatus.

Specimen HX-18A which is shown in Table 2 of the Example 1 was formed in an arc-shaped segment of 1.32 cm in outer diameter, 0.78 cm in inner diameter, 0.35 cm in thickness and 100° at a central angle. The specimen was sintered at 1330° C. for two hours, as shown in FIG. 4, both sides of the obtained elements 5' were applied with electrodes 6', and the elements were fixed between a pair of terminal plates 7' under pressure to prepare an exothermic device 4'. As in the embodiment as shown in FIG. 5, the exothermic device 4' was set around a core 3 in the tank 2 (FIG. 5). Insecticidal liquid (45 ml in every cases) was filled in the tank and consuming time of the total amount of the insecticidal liquid was measured when the exothermic device 4' was heated at 100 V and 220 V. The result is shown in Table 7.

TABLE 7

| | | Evaporating and diffusing time of insecticidal liquid (hr.) | | |
|---|---|---|---|---|
| | $R_{25\ 1\ (K\Omega)}$ | applied voltage of 100 V | applied voltage of 220 V | difference |
| 1 | 0.45 | 310 | 283 | 27 |

TABLE 7-continued

| | | Evaporating and diffusing time of insecticidal liquid (hr.) | | |
|---|---|---|---|---|
| | $R_{25\ 1\ (K\Omega)}$ | applied voltage of 100 V | applied voltage of 220 V | difference |
| 2 | 0.47 | 307 | 282 | 25 |
| 3 | 0.52 | 311 | 285 | 26 |
| 4 | 0.59 | 318 | 289 | 29 |
| 5 | 0.69 | 311 | 281 | 30 |
| 6 | 0.71 | 320 | 288 | 32 |
| 7 | 0.82 | 345 | 311 | 34 |
| 8 | 1.00 | 360 | 325 | 35 |
| 9 | 1.25 | 362 | 328 | 34 |
| 10 | 1.32 | 378 | 341 | 37 |
| avarage | — | 332 | 301 | 31 |

As apparent from the result of Table 7, the time for consuming the total amount of the insecticidal liquid in every specimens is short in the case of the applied voltage of 220 V in comparison with the case of the applied voltage of 100 V. However, the difference of time is only thirty one hours at the longest. According to the tests, it was recognized that there caused the difference of twelve hours for the consuming time of the total insecticidal liquid of 45 ml if there is a difference of 1° C. at the exothermic temperatures of the applied voltages 220 V and 100 V. Therefore, if the temperature difference is 7° C., the difference of the consuming time is eighty four hours. The exothermic devices used in Table 7 are included in the present invention.

As described above, according to the present invention, there is almost no difference at the exothermic temperature of the exothermic device, and stable characteristic can be obtained according to the difference of the applied voltages. In case more than two positive temperature coefficient thermistor elements are incorporated in the exothermic device, it is not necessary to arrange the normal temperature resistance in the respective elements. Thus, it can assemble the exothermic device by arbitrarily selecting elements. In the above-mentioned examples, the exothermic device of a liquid-type electric mosquito-fuge apparatus is described, but the present invention is not limited thereto. The present invention can be widely utilized to a heater for preventing freezing and other heating sources.

What is claimed is:

1. An exothermic device for providing substantially constant heat by electricity, comprising:

a sintered body formed of a ceramic material of $BaTiO_3$ containing a metal oxide, said sintered body forming a positive temperature coefficient thermistor and having in a predetermined voltage range between a lowest voltage of 70 V and a highest voltage of 250 V a linear voltage-current damping characteristic of 45° defined in a following equation:

$$Vx + Iy = \underline{a}$$

wherein $\underline{a}$ is a constant value, $Vx$ is a voltage on an axis of abscissa and $Iy$ is a current on an axis of ordinate in a cartesian coordinate, said thermistor with the linear damping characteristic of 45° keeping a consuming electricity of the thermistor substantially constant regardless an amount of a voltage applied thereto in case the voltage is in said predetermined voltage range so that the thermistor is heated at a substantially constant value.

2. An exothermic device according to claim 1, wherein said predetermined value for satisfying said equation is at least between 100 volt and 240 volt.

3. An exothermic device according to the claim 1, wherein said ceramic material of $BaTiO_3$ further contains $SiO_2$ and either Mn or Mn ion, the voltage-current characteristic of the positive temperature coefficient thermistor being decided by additive amounts of $SiO_2$ and Mn or Mn ion which are contained in the composition.

4. An exothermic device according to claim 1, wherein 0.1 wt % of $SiO_2$ and either 0.020 wt % of Mn or Mn ion are included in the ceramic material.

5. An exothermic device according to claim 1, wherein said ceramic composition has a formula of $$(BaPbCaY)TiO_3 + SiO_2 + Mn$$

0.1 wt % of $SiO_2$ and 0.020 wt % of Mn or Mn ion being included in the ceramic material.

6. An exothermic device according to claim 1, wherein said ceramic composition has a formula of $$(BaPbSrY)TiO_3 + SiO_2 + Mn$$

0.1 wt % of $SiO_2$ and 0.020 wt % of Mn or Mn ion being included in the ceramic material.

7. An exothermic device according to claim 1, wherein a difference of heated temperature of the thermistor when 100 V and 240 V are applied is within 7° C.

* * * * *